April 1, 1941.  P. D. KILBURY  2,236,711
DEHYDRATOR
Filed July 5, 1938    3 Sheets-Sheet 3
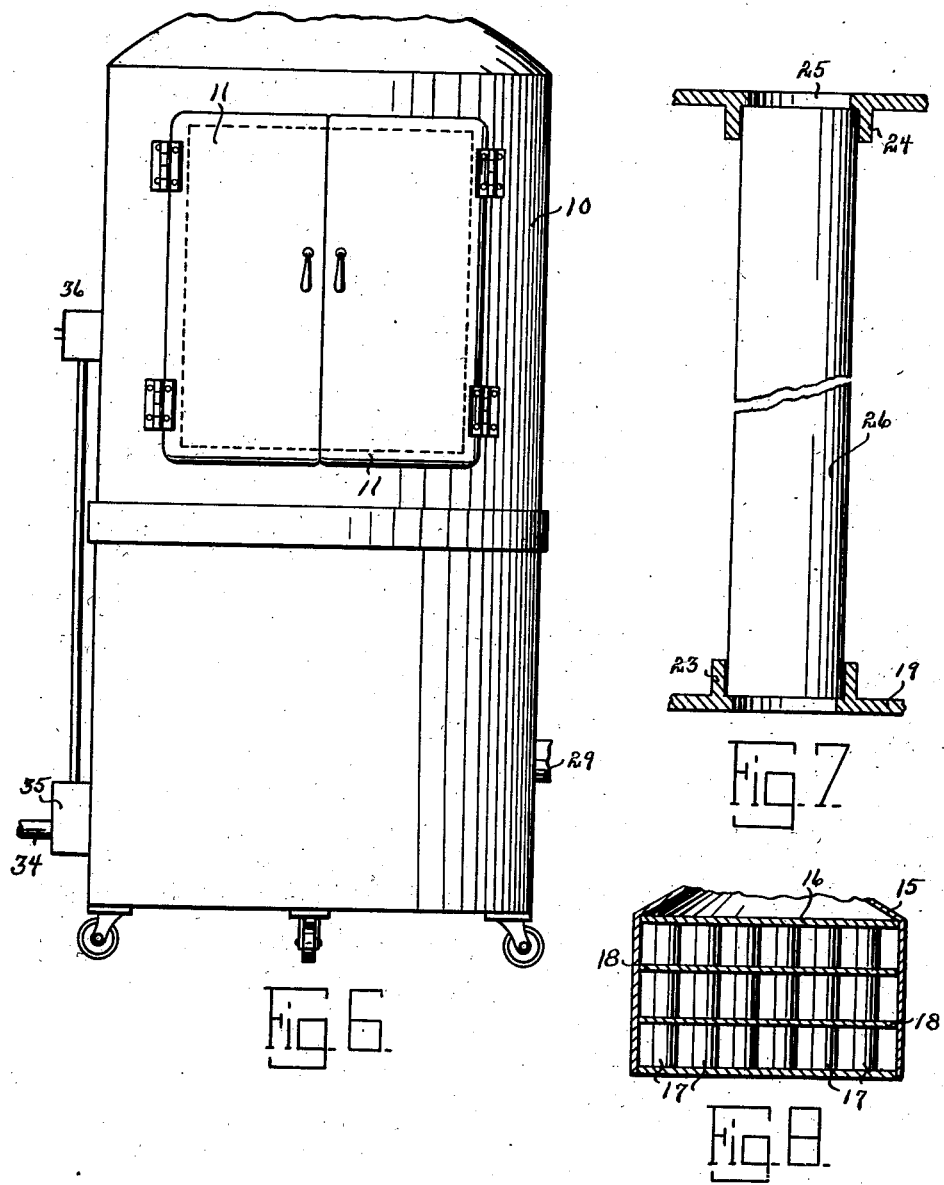
INVENTOR.
P. D. KILBURY
BY M. Talbert Dick
ATTORNEY.

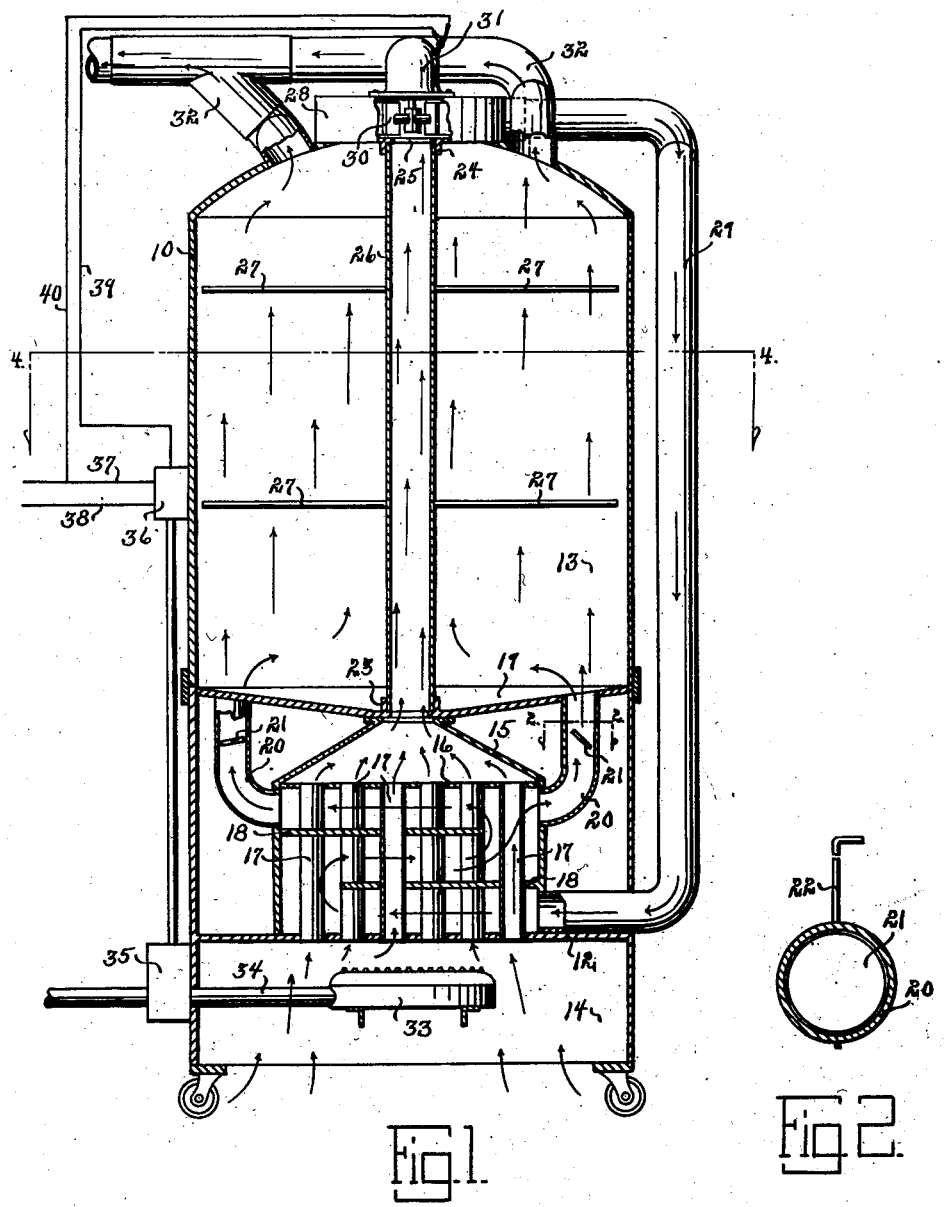

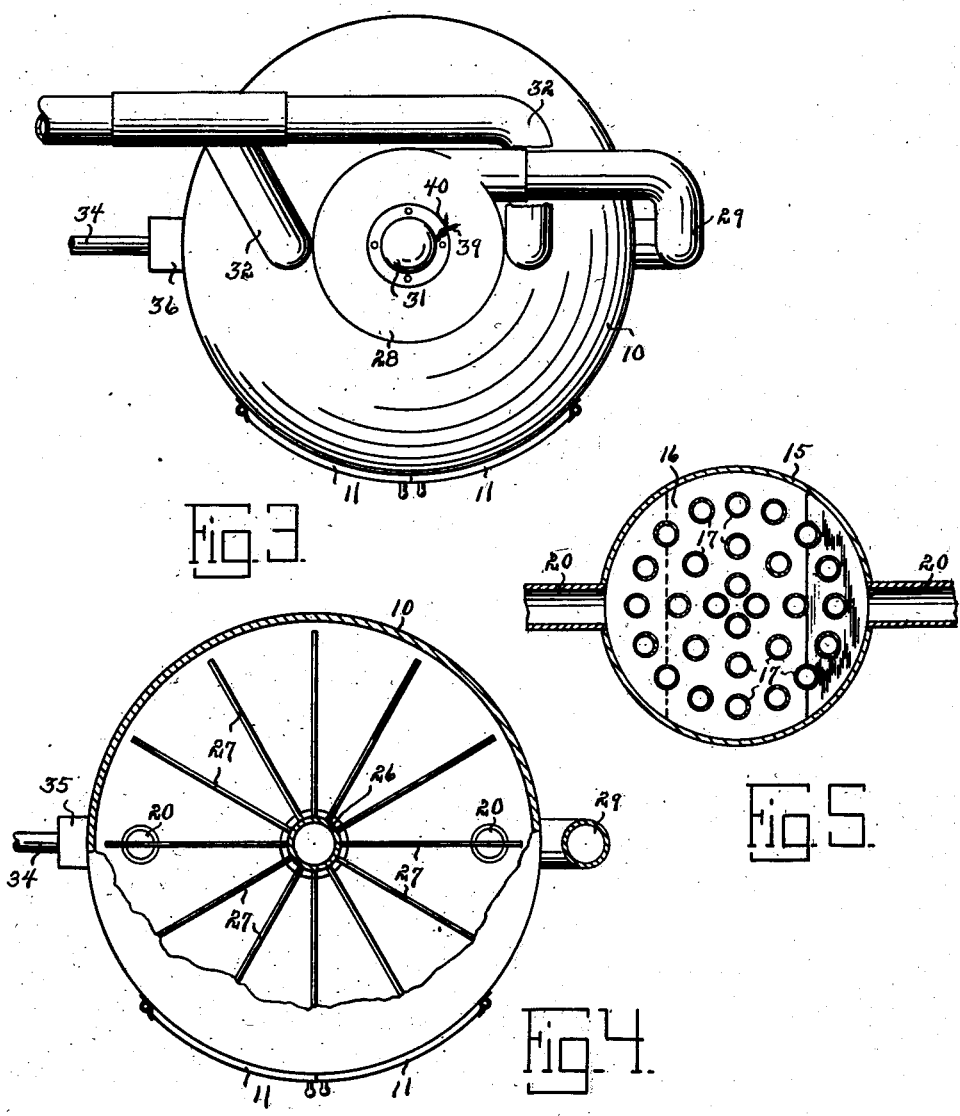

Patented Apr. 1, 1941

2,236,711

UNITED STATES PATENT OFFICE 2,236,711

DEHYDRATOR

Paul Duluth Kilbury, Newton, Iowa, assignor of one-half to John W. Billingsley, Newton, Iowa Application July 5, 1938, Serial No. 217,468

6 Claims. (Cl. 34—19)

The principal object of my invention is to provide a highly efficient drying device that may be used successfully for economically dehydrating various materials and/or items, but is particularly adapted for drying clothes, garments and like.

A further object of this invention is to provide a dehydrator that does not soil, smudge or introduce an obnoxious odor to the matter being dried.

A still further object of my invention is to provide a dehydrator that is economical in manufacture and durable and economical in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side sectional view of my device ready for use.

Fig. 2 is a cross sectional view of a damper valve used in the device and is taken on line 2—2 of Fig. 1.

Fig. 3 is a top plan view of my dehydrator.

Fig. 4 is a top view of my device with sections cut away to more fully illustrate its construction.

Fig. 5 is a top sectional view of the heat accumulating and distribution core.

Fig. 6 is a front view of my device with certain parts cut away.

Fig. 7 is an enlarged side view of the rotatably mounted center pipe.

Fig. 8 is a side sectional view of the core shown in Fig. 5.

Dehydration devices for drying clothes and like are not new. However, most of such devices are objectionable in that they are costly to operate, tend to soil or damage the material being dried, and are not easily operated. I have overcome such objections as will be hereinafter appreciated.

Referring to the drawings, I have used the numeral 10 to designate the housing of my device open at its bottom and having doors 11. The numeral 12 designates a horizontal partition in the lower part of this housing for creating a closed chamber 13 and a chamber 14 open at its bottom as shown in Fig. 1. The numeral 15 designates the heat collecting and distributing core housing centrally located on the top of the plate partition 12. This housing has a diameter much less than the diameter of the housing 10 and has its top portion cone shaped. The numeral 16 designates a horizontal plate partition in the upper portion of the housing 15. The numeral 17 designates a plurality of spaced apart vertical tubes in the housing 15 each having its uper end communicating with the area of the housing above the plate 16 and its lower end communicating with the center inside top of the compartment chamber 14. The numeral 18 designates a plurality of horizontal baffle plates inside the housing 15 and below the plate 16. These baffle plates 18 are perforated to allow the passage of the tubes 17 through them. The numeral 19 designates an inverted cone shaped partition plate inside the housing 10 and directly above the housing 15. This plate 19 has its center open to communicate with an opening in the center top of the housing 15 as shown in Fig. 1. The numeral 20 designates a plurality of conduits inside the housing 10 having their lower ends communicating with the inside of the housing 15 at spaced apart points directly below the plate 16 and their upper ends communicating with the inside bottom of the chamber 13 directly above the plate 19. The points where the conduits 20 communicate with the chamber 13 should be spaced apart and near the side of the housing 10. A damper valve 21 and damper handle 22 may be mounted in each of the conduits 20. The numeral 23 designates an upwardly extending collar bearing on the center top of the plate 19 and surrounding the opening in the center of that plate. The numeral 24 designates a downwardly extending collar bearing on the center inside top of the housing 10. This collar surrounds an opening 25 in the top of the housing 10. The numeral 26 designates a vertical pipe centrally located inside the housing 10 having its lower end bearing in the collar 23 and its upper end bearing in the collar 24. The numeral 27 designates a plurality of horizontally radially extending rack rods on the pipe 26. By this construction, the rods 27 and pipe 26 may be rotated as a unit and the pipe 26 will have its lower end communicating with the inside top of the housing 15 and its upper end communicating with the opening 25. The numeral 28 designates a fan housing on top of the housing 10 having its inlet port communicating with the opening 25 and the outlet port communicating with one end of a pipe 29. The numeral 30 designates a rotatably mounted fan inside the fan housing and connected to the electric motor 31. The pipe 29 extends from the fan housing and has its other end communicating with the inside of the housing 15 at a point below the baffles 18. The numeral 32 designates exhaust pipes communicating at various points with the inside top of the housing 10. The numeral 33 designates a gas or like burner in the compartment 14 and directly below the pipes 17. The numeral 34 designates the fuel inlet pipe leading to the burner 33. Imposed in this pipe is a control valve and housing 35 shown in conventional form in Fig. 1 and controlled by a time switch or like mechanism shown in conventional form in Fig. 1 and designated by the numeral 36. The electric power wires are designated by the numerals 37 and 38 which enter the switch 36. The numerals 39 and 40 designate the motor 31 lead wires, one of which is electrically connected to the lead wire 37 and the other of which is electrically connected to the switch 36.

To operate my device, it is merely necessary to set the device so that the burner 33 will be functioning and the fan 30 running. The heat from the burner 33 will pass upwardly through the tubes 17 into the upper portion of the housing 15. From this housing 15, the hot gases will be pulled upwardly through the pipe 26, then forced downwardly through the pipe 29 into the lower portion of the housing 15. The hot gases entering the housing 15 will pass around the baffle plates 18 in a sinuous path and around the pipes 17, then through the pipes 20 and into the compartment 13 above the plate 19. The material to be dried is placed or supported inside the compartment 13. Supporting members for holding the material are secured to the rotatable pipe 26. In the case of clothes or like, the same may be hung on radially extending rods 27. The hot gases pass upwardly in the compartment 13 through the matter to be dried and then out of the top of the housing 10 through the exhaust pipe 32. The movements of the air, heat and hot gases are shown by arrows in Fig. 1. After the matter has been properly dehydrated, the doors 11 are opened and the dehydrated matter removed. The placement of the matter to be dried on the rods 27 and the ermoval of the same is facilitated by the possible manual rotation of the pipe 26 and supporting member 27. Obviously, material may be hung on the rods 27 adjacent the doors 11 and then rotated to positions at the rear of the compartment 13. The complete movement of the air, heat and hot gases is actuated by the fan 30 and the speed of movement of the same relative to the heat of the oil burner 33 is such that the material being dried would not be burnt or damaged even though the same comes in direct contact with the plate 19 or pipe 26. One of the chief features of this device is that the burner 33 has its bottom and sides in direct communication with the outside atmosphere. By virtue of rising heat and the action of the fan 30, a maximum amount of air will flow around the burner 33, thereby preventing its smoking or fouling the air and hot gases passing through the device. Obviously, all of the air that passes through the device must also pass around the heater 33 which is positioned in spaced relationship directly below the tubes 17. If desired, the pipe 29 may extend downwardly inside the housing 10. Any automatic means may be used for controlling or regulating the operation of the burner 33 and fan 30. Heat from the pipe 26 will heat the central area of the compartment 13 and by terminating the pipes 20 near the inner side of the housing 10, the extreme outer area of the compartment 13 will also be subjected to drying action.

Although I have described my device as particularly desirable for drying clothes and like, obviously, it is useful for drying various items, material and matter. By virtue of such air furnished the burner 33 and by the control and direction of the heating air, my device is most economical in operation. From the foregoing it will readily be seen that I have provided a highly desirable dehydrating device.

Some changes may be made in the construction and arrangement of my improved dehydrator without departing from the real spirit and purpose of my invention, and it is my intention to cover by my claims any modified forms of structure or use of mechanical equivalents which may be reasonably included within their scope.

I claim:

1. In a device of the class described, a housing open at its bottom, a door in said housing, a horizontal partition in said housing for creating an upper compartment and a space below it, a flame producing means in the bottom portion of said housing and below said partition, an exhaust conduit leading from the upper portion of said compartment, a motor driven fan having an inlet port and an outlet port, a pipe inside of and concentric with the inside of said housing having one end communicating with the inlet port of said fan and its other end operatively communicating with the space below said partition and above said flame producing means, and a conduit having one end communicating with the outlet port of said fan and its other end operatively communicating with the inside bottom of said compartment.

2. In a device of the class described, a housing open at its bottom, a door in said housing, a horizontal partition in said housing for creating an upper compartment and a space below it, a flame producing means in the bottom portion of said housing and below said partition, an exhaust conduit leading from the upper portion of said compartment, a motor driven fan having an inlet port and an outlet port, a pipe inside of and concentric with the inside of said housing having one end communicating with the inlet port of said fan and its other end operatively communicating with the space below said partition and above said flame producing means, a conduit having one end communicating with the outlet port of said fan and its other end operatively communicating with the inside bottom of said compartment, and matter supporting members on said pipe and inside said compartment.

3. In a device of the class described, a housing open at its bottom, a door in said housing, a horizontal partition in said housing for creating an upper compartment and a space below it, a flame producing means in the bottom portion of said housing and below said partition, an exhaust conduit leading from the upper portion of said compartment, a motor driven fan having an inlet port and an outlet port, a vertical pipe centrally located in said compartment having one end communicating with the inlet port of said fan and its other end operatively communicating with the space below said partition and above said flame producing means, and a conduit having one end communicating with the outlet port of said fan, and its other end operatively communicating with the inside of said compartment.

4. In a device of the class described, a housing open at its bottom, a door in said housing, a horizontal partition in said housing for creating an upper compartment and a space below it, a flame producing means in the bottom portion of said housing and below said partition, an exhaust conduit leading from the upper portion of said compartment, a motor driven fan having an inlet port and an outlet port, a rotatably mounted pipe inside said compartment having one end communicating with the inlet port of said fan and its other end operatively communicating with the space below said partition and above saia flame producing means, material holding means on said pipe, and a conduit having one end communicating with the outlet port of said fan and its other end operatively communicating with the inside of said compartment.

5. In a dehydrating device, a housing, a door in said housing, a horizontal partition having an opening, positioned in said housing and near the bottom of said housing, a flame producing means below said partition, a second partition in said housing and spaced above such first mentioned partition; said last mentioned partition having openings, supporting members inside said housing and above said last mentioned partition and a baffle member positioned between said two partitions and above the opening in said first mentioned partition.

6. In a device of the class described, a housing open in its bottom, a door in said housing, a horizontal partition in said housing, a flame producing means in the bottom portion of said housing and below said partition, a second partition in said housing and spaced above such first mentioned partition, an exhaust conduit leading from the upper portion of said housing, a motor driven fan having an inlet port and an outlet port, a vertical pipe rotatably mounted in said housing and communicating with inlet port of said fan, a plurality of tubes having one of their ends communicating with area below said first mentioned partition and their other ends communicating with the inside of said pipe, and a conduit having one end communicating with the outlet port of said fan and its other end operatively communicating with the inside of said housing above said second mentioned partition.

PAUL DULUTH KILBURY.